(12) United States Patent
Kelesis

(10) Patent No.: US 8,996,573 B2
(45) Date of Patent: Mar. 31, 2015

(54) JOURNALING SYSTEM WITH SEGREGATED DATA ACCESS

(76) Inventor: George Peter Kelesis, Las Vegas, NV (US)

(*) Notice: Subject to any disclaimer, the term of this patent is extended or adjusted under 35 U.S.C. 154(b) by 315 days.

(21) Appl. No.: 13/270,095

(22) Filed: Oct. 10, 2011

(65) Prior Publication Data

US 2013/0091172 A1   Apr. 11, 2013

(51) Int. Cl.
*G06F 17/30* (2006.01)
*G06F 21/62* (2013.01)

(52) U.S. Cl.
CPC .................................. *G06F 21/6218* (2013.01)
USPC .............................. 707/783; 707/784; 707/785

(58) Field of Classification Search
CPC ............... G06Q 30/0269; G06Q 50/01; Y10S 707/99945; H04L 12/588; H04L 12/585
USPC .................. 707/705, 707, 732, 783, 784, 785
See application file for complete search history.

(56) References Cited

U.S. PATENT DOCUMENTS

| | | | |
|---|---|---|---|
| 5,999,978 A * | 12/1999 | Angal et al. | 707/999.009 |
| 6,065,051 A | 5/2000 | Steele et al. | |
| 6,199,157 B1 | 3/2001 | Dov et al. | |
| 6,253,325 B1 | 6/2001 | Steele et al. | |
| 6,314,458 B1 | 11/2001 | Steele et al. | |
| 6,393,468 B1 | 5/2002 | McGee | |
| 6,633,311 B1 | 10/2003 | Douvikas et al. | |
| 6,691,158 B1 | 2/2004 | Douvikas et al. | |
| 6,889,213 B1 | 5/2005 | Douvikas et al. | |
| 6,952,730 B1 | 10/2005 | Najork et al. | |
| 7,017,109 B1 | 3/2006 | Douvikas et al. | |
| 7,024,451 B2 | 4/2006 | Jorgenson | |
| 7,069,308 B2 | 6/2006 | Abrams | |
| 7,117,254 B2 | 10/2006 | Lunt et al. | |
| 7,188,153 B2 | 3/2007 | Lunt et al. | |
| 7,233,997 B1 | 6/2007 | Leveridge et al. | |
| 7,269,590 B2 * | 9/2007 | Hull et al. | 707/770 |
| 7,373,338 B2 | 5/2008 | Thompson et al. | |
| 7,451,161 B2 | 11/2008 | Zhu et al. | |
| 7,478,078 B2 | 1/2009 | Lunt et al. | |
| 7,606,687 B2 | 10/2009 | Galbreath et al. | |
| 7,669,123 B2 | 2/2010 | Zuckerberg et al. | |
| 7,680,882 B2 | 3/2010 | Tiu, Jr. et al. | |
| 7,725,492 B2 | 5/2010 | Sittig et al. | |
| 7,788,260 B2 | 8/2010 | Lunt et al. | |
| 7,797,256 B2 | 9/2010 | Zuckerberg et al. | |
| 7,809,805 B2 | 10/2010 | Stremel et al. | |
| 7,827,208 B2 | 11/2010 | Bosworth et al. | |
| 7,827,265 B2 | 11/2010 | Cheever et al. | |
| 7,890,501 B2 | 2/2011 | Lunt et al. | |
| 7,933,810 B2 | 4/2011 | Morgenstern | |
| 2005/0177385 A1 * | 8/2005 | Hull et al. | 705/1 |
| 2006/0277076 A1 * | 12/2006 | Hasan et al. | 705/3 |
| 2007/0282877 A1 * | 12/2007 | Fischer et al. | 707/101 |
| 2008/0132251 A1 * | 6/2008 | Altman et al. | 707/100 |
| 2010/0205179 A1 | 8/2010 | Carson et al. | |
| 2011/0072022 A1 | 3/2011 | Tardif | |

* cited by examiner

*Primary Examiner* — Vincent F Boccio

(74) *Attorney, Agent, or Firm* — Weide & Miller, Ltd.

(57) ABSTRACT

A journaling system provides access to subsets of user information in a segregated fashion. This permits its users to define access settings for their user information thereby limiting which other users may access the user information. In one or more embodiments, the journaling system may include a server or other computing device and one or more storage devices used to store the user information, associated access settings, or both. The access settings may define particular criteria which must be met before a subset of user information may be accessed, and may identify particular users that may access the subset of user information.

20 Claims, 4 Drawing Sheets

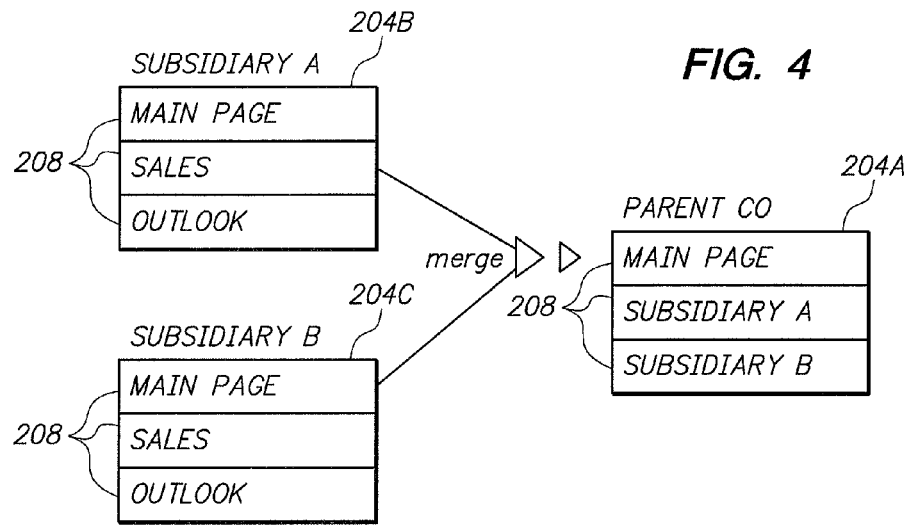
FIG. 4
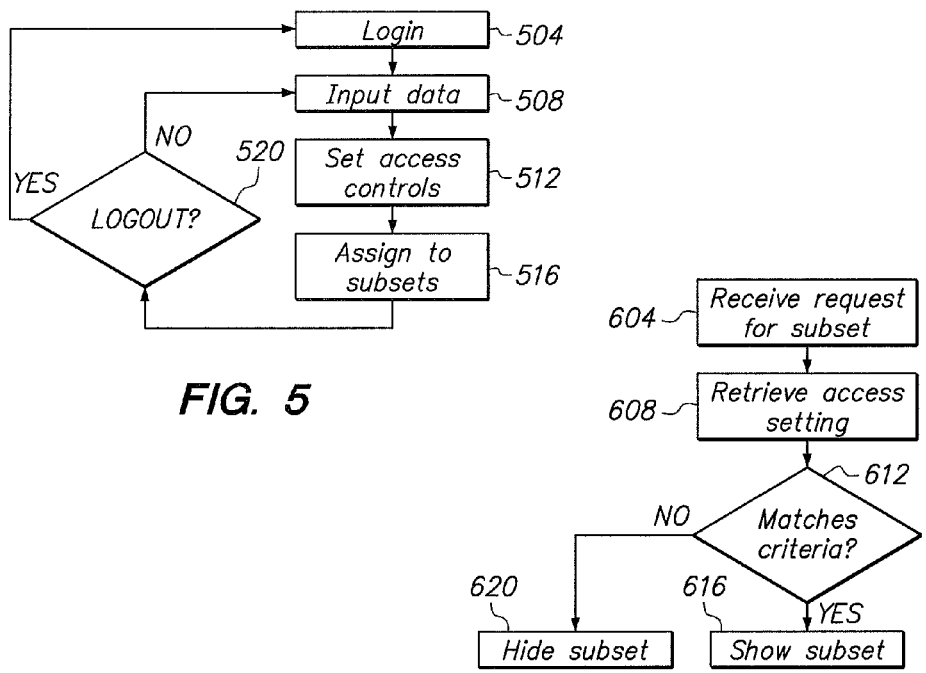
FIG. 5
FIG. 6

JOURNALING SYSTEM WITH SEGREGATED DATA ACCESS

BACKGROUND OF THE INVENTION

1. Field of the Invention

The invention relates to personal information storage and hosting systems and in particular to a journaling system with segregated data access.

2. Related Art

Blogs, personal websites, photo or video sharing websites, and similar sites provide access to personal information of all sorts. With countless individuals contributing their own information to these sites, the amount of information online has become vast. This has led to the notion of ubiquitous cloud computing whereby personal information is stored on and accessed from remote storage systems rather than a person's own devices. Remote storage of personal information in this manner raises a set of problems not addressed by traditional information storage and hosting systems.

From the discussion that follows, it will become apparent that the present invention addresses the deficiencies associated with the prior art while providing numerous additional advantages and benefits not contemplated or possible with prior art constructions.

SUMMARY OF THE INVENTION

A journaling system is disclosed. In general the journaling system provides a repository for various types of user information or content and for controlling access to such information by third parties. The journaling system provides the benefit of allowing various subsets of user information to be defined and protected by one or more specific access controls. In this manner, a user may feel free to post or share their information since access to different subsets of the user information may be independently controlled by the user.

The journaling system may have a variety of configurations. For instance, in one exemplary embodiment, the journaling system may comprise a system for storing and providing access to one or more subsets of user information, the system having one or more communications devices configured to receive the user information and one or more access settings. The access settings may be associated with one or more subsets of the user information.

One or more processors, such as associated with web servers, may be configured to compare the access settings to user criteria may be included. Access to one or more of the subsets may then be granted upon at least one match between the user criteria and the access settings. The communications devices may be configured to send one or more of the subsets of user information upon at least one match between the user criteria and the access settings. One or more storage devices may be provided as well to retrievably store the subsets of the user information.

The subsets of the user information may comprise information selected from the group consisting of personal information, career information, and hobby information, among others. The subsets of the user information may alternatively or also comprise one or more subsets of user information from one or more other users.

It is noted that a main access setting may be associated with all of the user information such that user criteria matching the main access setting grants access to all of the user information. A user may modify such a "base" setting to define specific access control for subsets of information, such as particular pages of information. In addition, the communications devices may be configured to receive the access settings from a user terminal, and/or to receive the user information from a user terminal.

In another embodiment, a journaling system for storing and providing access to one or more subsets of user information may comprise one or more communications devices configured to receive the user information and one or more access settings from a user. The access settings may be associated with one or more subsets of the user information and the user information may comprise one or more subsets of user information from one or more other users. For example, the user may be a corporation and the other users may be subsidiaries of the corporation.

One or more processors may be configured to compare the access settings to user criteria, and access to one or more of the subsets may be granted upon at least one match between the user criteria and the access settings. Access to one or more of the subsets of the user information may also be granted to one or more users identified in the access settings.

Various methods of providing access to one or more subsets of user information with a journaling system are also disclosed herein. For example, in one embodiment, such a method could comprise receiving from a user the subsets of the user information at one or more servers of the journaling system, and receiving from the user one or more access settings configured to control access to the subsets of user information. The access settings may then be associated with the subsets of the user information.

One or more of the subsets of the user information may be retrieved from one or more storage devices, and the one or more of the subsets of the user information may then be provided to a particular one or more other users based on the one or more access settings. Access to the one or more of the subsets of the user information may be prevented for one or more other users. For example, the one or more of the subsets of the user information may be provided to the particular one or more users when the particular one or more users are identified in the access settings, or when the particular one or more users have criteria matching those in the access settings.

It is contemplated that the servers of the journaling system may receive an indicator from the users defining which of the access settings are associated with which of the subsets of the user information. In addition, one or more criteria from the user as part of the access settings. Also, one or more user identifiers identifying the particular one or more other users may be received from the user as part of the access settings.

The invention has particular utility to social media type websites or blog-type sites. In accordance with the invention, a user may segregate their information into one or more web pages or the like. For example, a user may define a main page, a work/career page, a family page, a hobbies page or the like, each having different associated content. The user may control access to each page, such as to allow a wide range of third parties (such as the general public) to access or view non-private information, but to limit access to private information (such as by limiting access to certain individuals or a private group, such as family members). For example, a user might allow public access to their home page, but limit access to their family page to identified family members.

In embodiments in which third parties may post information or content to the user's sets of information or pages, the user may similarly control those parties who can upload or provide content. The user might define different access controls for parties who may post information or content and those parties who may merely view content.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 4 is a block diagram illustrating exemplary subsets of user information.

FIG. 5 is a flow diagram illustrating an exemplary process for setting up user information and access settings.

FIG. 6 is a flow diagram illustrating an exemplary process for retrieving requested subsets of user information.

DETAILED DESCRIPTION OF THE PREFERRED EMBODIMENTS

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the journaling system herein provides storage for and access to various sorts of user information. As used herein, user information may be whatever information a person stores on the journaling system. User information may include information pertaining to a person's personal life, public life, career, family, or the like. This may include events or occurrences that the person sees, hears, senses, or experiences. The user information may also include a person's thoughts, such as one might write in a diary or journal. User information can be in the form of photos, text, videos, graphics, symbols, animations, or other forms.

As will be disclosed in further detail below, the journaling system provides the benefit of segregated third party access to user information. This allows users to control access by third parties to different subsets of their user information. In this manner, a user may organize user information such that particular subset(s) are accessible to those who may need or benefit most from it, and/or to keep certain user information from certain third parties (such as to control access to private information). In particular, access to particular subset(s) of user information may be limited such that the user may easily control who may and who may not access the user's user information. These capabilities are highly beneficial given the uncontrollable and somewhat unmanageable nature of online information, which is accessible to virtually anyone from virtually anywhere.

The segregated data access provided by the journaling system also encourages those who would otherwise be wary of sharing user information online to do so. This is because the journaling system allows a user to carefully control under what circumstances particular user information is available. For example, a public figure (or any user) may desire greatly to participate in online conversations, photo sharing, and other social networking. However, the public figure may be unable or unwilling to do so for fear of his or her user information, such as his or her private thoughts, being uncontrolled and unmanaged in the online world. With the journaling system, a user (public figure or not) may participate in free expression from a single user account on the journaling system.

Figure 1:
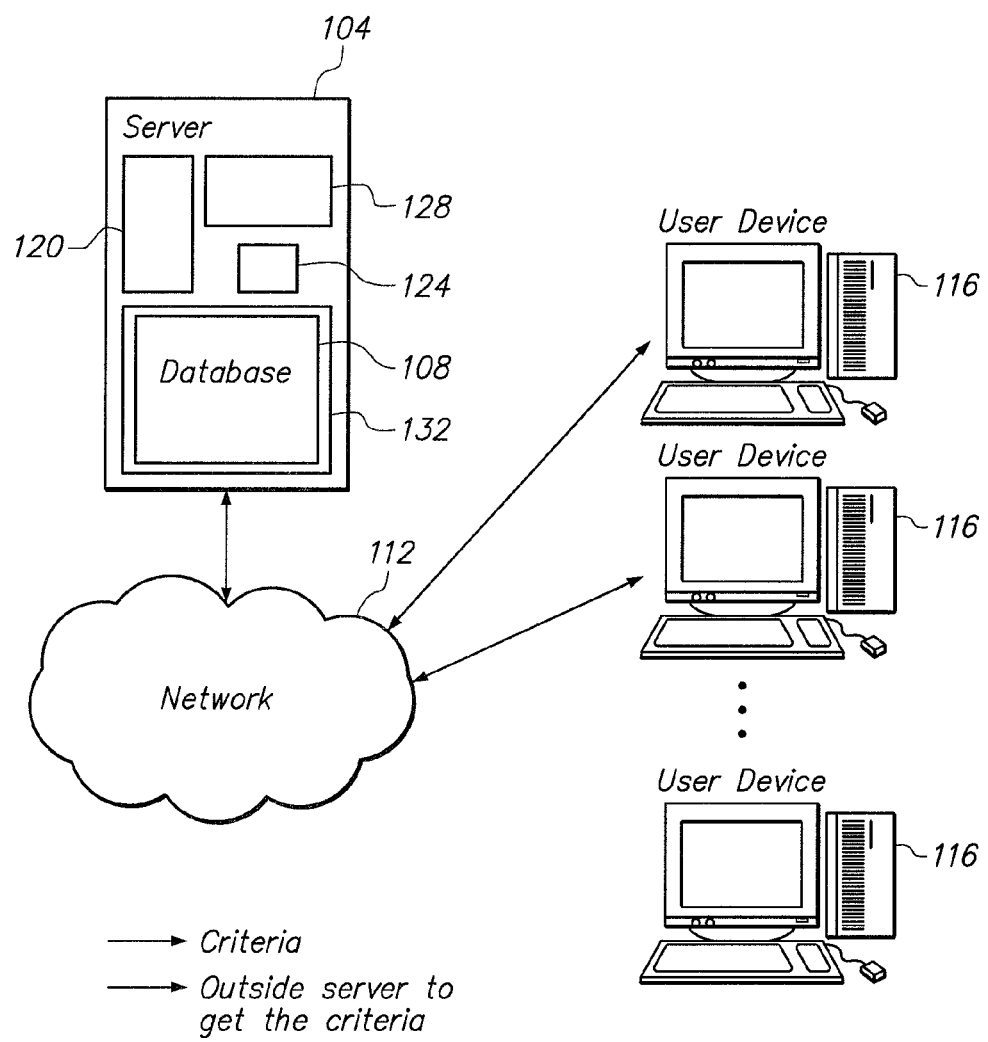
FIG. 1 is a block diagram illustrating elements of an exemplary journaling system.

The journaling system will now be described with regard to FIG. 1, which is a block diagram illustrating components of an exemplary journaling system. As can be seen, the journaling system may comprise at least one server 104 capable of storing user information. In FIG. 1, the server 104 stores user information in at least one database 108, though it is noted that the user information may be stored in various forms or formats. In addition, the database 108 or other storage need not be part of the server 104 but may be data storage that is remotely accessible to the server. It is also noted that various computing devices may be used instead of a server 104 per se.

The server 104 may comprise a computing-type device. For example, the server 104 may comprise one or more processors 120, at least one communication device or interface 124, and one or data storage or memory devices 128. In one or more embodiments, the processors 120 may be configured to execute one or more instructions, such as in the form of machine readable code (i.e. "software"), to allow the server 104 to perform the functions herein. One or more remotely accessible or local storage devices 132 may be included to store such machine readable code for execution by the processors 120. It is noted that the storage devices 132 may also store the database 108 or other data format holding the user information. The storage devices 132 may store data on various tangible mediums. For example, a storage device 132 may utilize magnetic, optical, flash, other mediums, or various combinations thereof to store data. Some or all of a storage device 132 may be read-only. In addition, the storage medium may be removable in some embodiments.

In general, the memory devices 128 will be used as temporary storage. For example, the memory devices 128 may be random access memory or cache memory used to temporarily store some user information and/or instructions for execution by a processor 120.

The communication devices or interfaces 124 will typically be configured to allow communication with remote devices, such as the user devices 116 shown in FIG. 1. The user devices 116 might also comprise computing or communication devices. For example, the user devices 116 may comprise or include a desktop or laptop computer, a tablet, a telephone, a PDA, a kiosk or the like. Preferably, the user devices 116 are capable of receiving user input, transmitting data and receiving data (such as via a communication interface), and display information or data, such as via a video display.

The communication devices 124 may permit data to be exchanged between the server 104 and one or more remote devices, such as over one or more wired and/or wireless communication paths or links (which paths may include WANs, LANS, public or private networks, the Internet, cellular telephone networks or the like). The communication devices 124 may be capable of utilizing various communication protocols, such as TCP/IP, to communicate with a wide variety of other devices.

In one or more embodiments, user information may be exchanged between the server 104 and one or more user devices 116 via communication with the server 104. For example, a user device 116 may establish a communication link or other communications with a server 104 via the server's communication device 124. This connection or link may then be used to share or exchange user information between the user device 116 and the server 104. User information may be uploaded to and then stored on the storage device 132, and/or be downloaded or retrieved from the storage device 132 during this process. As indicated above, the communications may take place through one or more networks 112, such as shown in FIG. 1.

Figure 2:
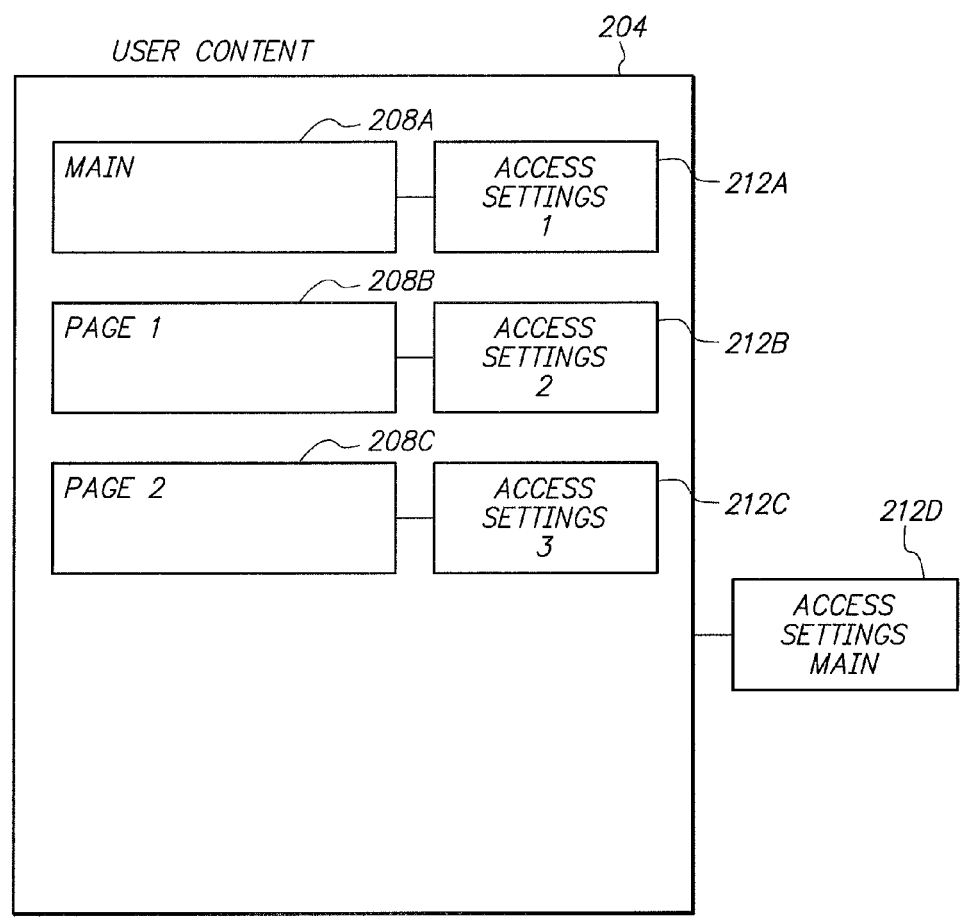
FIG. 2 is a block diagram illustrating exemplary subsets of user information.

FIG. 2 is a block diagram illustrating exemplary user information 204 that may be stored on a storage device of the journaling system. As can be seen, in accordance with the invention, user information 204 may be divided or segregated into various subsets or parts 208. Relative to information which is displayed via a website, the user information 204 may be segregated into "web pages" which are viewable via a web browser. However, the information might be segregated in other manners and displayed in various manners (such as by other than a web browser). Though shown as separate portions in FIG. 2, it is noted that various subsets 208 of user information may share certain of the user information. For example, a user's birthday, residence, contact information, or the like may be part of two or more data or information subsets 208.

As shown in FIG. 2, each subset 208 of user information may be assigned or associated with particular access settings 212. As indicated herein, the access settings 212 for two or more information subsets 208 may vary from one another. For instance, as shown in FIG. 2, "Main" user content 208A has been associated with Access Settings 212A, "Page 1" content 208B has been associated with Access Settings 212B, and "Page 2" content 208C has been associated with Access Settings 212C. It is noted that all user content 204 may be accessible as well, such as according to its own access settings 216. For example, the user may be given access to all user content 204 belonging to him or herself upon meeting the criteria in the access settings 212D. Likewise, access to subsets 208 of user content 204 may be granted if criteria set by their respective access settings 212D are met.

The access settings 212 may have criteria or rules defining which users may access the user content 204. For example, the access settings 212 may identify particular users that may access the user content 204 or various subsets 208 thereof. This may occur by confirming that a user or a user's account has a certain characteristic. For example, if the user's account indicates that he or she is part of a particular group of users, access may be granted to the user content 204 or a subset 208 thereof.

Alternatively or in addition, the access settings 212 may have criteria or rules defining which users may add to the user content 204, such as by commenting or adding text, images, sounds, or video to the user content. In some instances, the access settings 212 may provide that any additions to the user content 204 must be first approved by the user. For example, comments or other additions to the user content 204 may first be approved by the user (to which the user content belongs) before they are included in and viewable with the user content 204. As disclosed above, the access settings 212 may define different capabilities for different users. Thus some users may be permitted to add to user content 212 without approval while others would need approval.

In one embodiment of the invention, a user may designate another user of the journaling system as having access to content. In particular, each user of the journaling system may sign up for the system and may select or be assigned certain access information. That access information might comprise, for example, a user name and password. In one embodiment, one user might grant access to certain of their content by associating the other user's user name with the designated content. For example, Sue may have the user name "SueStar", while Bill may have the user name "Bronco." Sue may provide access authority to her "horses" page by designating "Bronco" as an authorized user for that page.

In other embodiments, however, it is contemplated that the access settings 212 may also provide access to users that do not have an account with the journaling system. For instance, the access settings 212 may provide tokens or other identifiers for such users to access the journaling system. In this way, these users may access user content 204 in the journaling system without having signed up with the journaling system, such as by inputting the token or identifier into the journaling system when prompted. The token or identifier may be a secret code or password that permits a user to view the user content 212 of the user who provided the token or identifier only. For example, relative to the above-example, Bill may not be a user of the system. Sue may thus provide access authority by creating a token, such as "Bill642" and then associating that token with the designated content. Bill may then access the content by providing the access token "Bill642" which Sue created for him. Of course, such tokens, passwords or other identifiers might be created by the user, assigned by the system, etc.

The access settings 212 may allow a user to identify one or more subsets 208 that are accessible without restriction. For example, if a user has a subset 208 which lists items that he or she is selling, or any other subset 208 which the user desires to make public, such subsets may be made accessible without restriction by defining the same in the access settings 212. In this manner, the "open" subsets 208 may be accessible and indexable by a search engine and may be found via the search engine, by a hyperlink, by direct access to the subsets, or the like.

The access settings 212 may be set by a user. For example, the user may select particular groups or types of user accounts that may access one or more subsets 208 of his or her user content 204. The user may also identify one or more particular users to grant or deny them access to particular subsets 208 of user content 204. In this manner, the user controls which other users may have access to his or her user content. This is highly advantageous in that it gives the user freedom to include whatever information he or she desires in his or her user content. This is because the user can prevent certain users from seeing subsets 208 of the user content that the user does not want these other users to be able to see.

Figure 3:
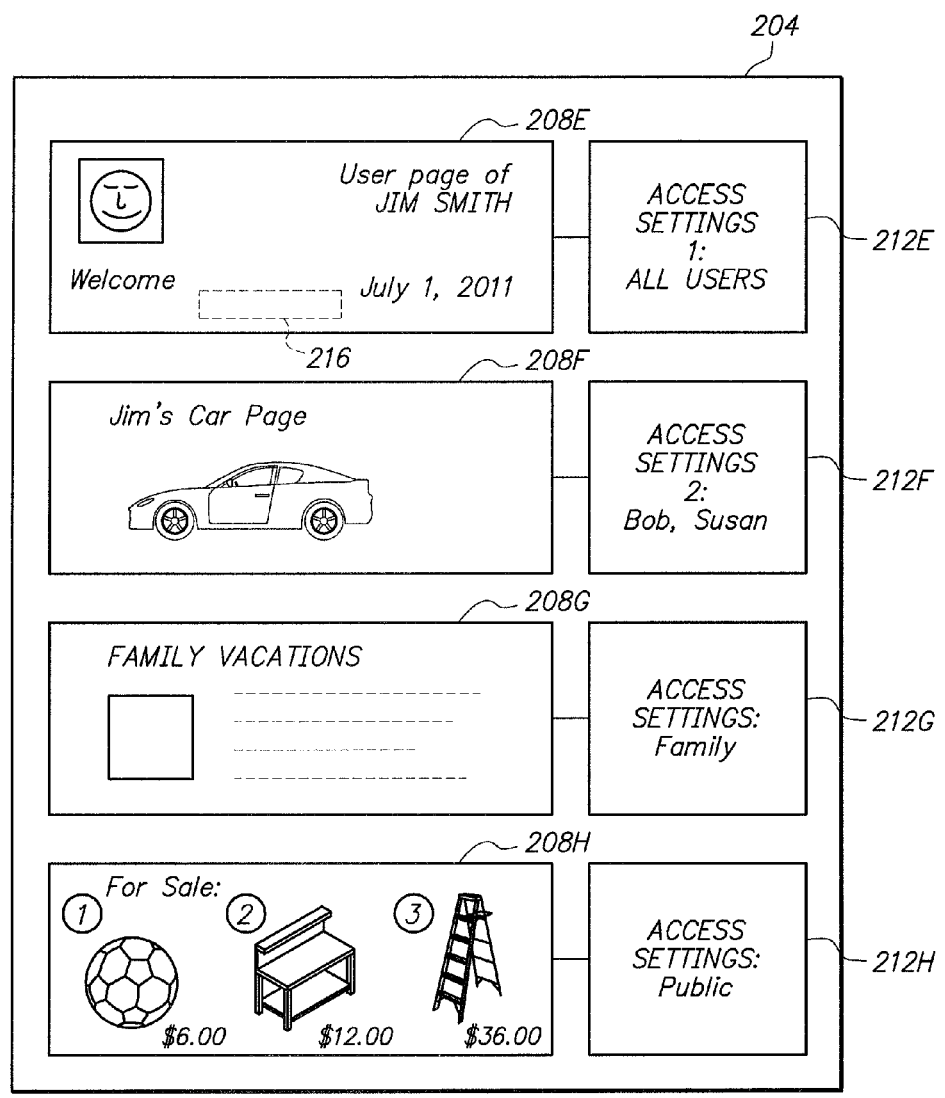
FIG. 3 is a block diagram illustrating exemplary subsets of user information.

FIG. 3 illustrates various access settings 212 for an exemplary user. As can be seen, the user has three separate subsets of user content in this example: a main page subset 208E (which might include generally public content such as a photo of the user, their name, etc.); a car page subset 208F (which might include photos of the user's car(s), information about their cars, pictures of their favorite cars, etc); a family vacation page subset 208G (which might include vacation photos, text describing the vacations, etc); and a sale page subset 208H (which might list items the user has for sale). Each of these subsets 208 preferably have their own access settings 212, such as described above. To illustrate, the main page subset 208E has access settings 212E, the car page subset 208F has access settings 212F, the family vacation page subset 208G has access settings 212G, and the sale page subset 208H has access settings 212H.

It is noted that one of the subsets 208, such as the main subset 208E may provide a table of contents 216 or other similar listing that shows an index of the information in the user content 204. For example, the table of contents may have a list of the subsets 208 that make up the user content 204. It is contemplated that the table of contents 216 may only show subsets 208 a user has access to in some embodiments. Alternatively, the table of contents 216 may show a listing of all subsets 208 but only provide access to those allowed by the access settings 212. The access settings 212 may define what is in the table of contents 216 and what is not. In one embodiment, only subsets 208 a user has access to are automatically shown based on the permissions defined in the access settings 212. For example, a user may wish for certain users to see all items in the table of content, such as to entice those users to want to gain access to subsets of the content to which the user does not have access. As one example, a politician might have a journal with different subsets 208, such first, second and third level subsets 208 of information, where each "level" of information provides the user with more information about the politician. The politician might grant users who donate to a first level with access to the first level subset 208, and grant users who donate to the second level with access to the second level subset 208, and so on. The first level users may be permitted to see that there are two more levels of content via the table of contents, thus enticing the first level users to donate more so that they are designate as having access to the other subsets. On the other hand, a user might not wish for a particular user to see that certain content even exists. For example, a user Sue may have one subset 208 of content which relates to "work" and may post information about her boss on that page. Sue may wish to allow her boss to see another subset 208 of her information, such as travel, but not let her boss access or even see that the "work" content exists.

It can also be seen from FIG. 3 that each of the access settings 212 may identify different groups or users that may access an associated subset 208 of user content 204. To illustrate, the exemplary user content 204 of FIG. 3 has access settings 212E that allow all users to access a subset 208E of user content 204. This may be general information about the user, such as the user's name, residence and birthdate. The main page subset 208E may also include photo(s) of the user, one or more welcome or information messages about the users. It is noted that the user may input whatever information the user desires in any subset 208 of user content 204. The user may choose what information to include in a subset 208 based on the users that have access to the subset.

In FIG. 3, the car page subset 208F has access settings 212F that allow particular users to access the car page subset 208F. As shown for example, users Bob and Susan have been identified as having access to the car page subset 208F. Thus, Bob and Susan can access this subset 208F of user content 204. It is noted that since Bob and Susan are also users they may also access the main page subset 208E.

The family vacations subset 208G has access settings 212G that allow users of a particular type or having a particular account characteristic to access the subset. As shown, users identified as part of the "family" group may access the family vacations subset 208G. The user may identify which users are in the family group, or alternatively, the users themselves may identify that they are within the family group. This may be confirmed by an administrator of the group before users may be officially made part of a group. A user's account may be tagged or an identifier may be included in the user's account indicating his or her status as part of a particular group. It is noted that Bob and/or Susan (or other user(s)), if part of the family group, would be able to access the family vacations subset 208G.

The sale page subset 208H may have more permissive access settings 212H, such as to allow public access to the sale page subset. This is beneficial if the user desires a wide audience for the subset. For example, the user may wish to make the sale page subset 208H more easily accessible or even publicly accessible (e.g., accessible to anyone) since that would increase the possibility of a sale of one or more items the user has for sale via the sale page subset 208H. As state above, the access settings 212H may be set such that a search engine may index the sale page subset 208H to allow others to more easily find the sale page subset.

It is noted that the sale page subset 208H also shows the versatility of the journaling system. For instance, the journaling system may provide an e-commerce solution for its users who desire to conduct commerce online, such as by selling goods or services via an online store front. The journaling system may provide users the capability to accept payments and orders online. This capability may be included in any subsets 208, where its access may be limited (or broadened) based on an associated access setting 212. The journaling system may gather information from each user's "sale" page and combine it into such a store-front. Potential customers may access the storefront in order to search for goods or the like which are for sale. At the same time, potential customers might also search for goods via a search engine and the search engine may provide as results the specific sale page subsets 208H of users having the searched-for item (because such content has been designated for open access, thus permitting the search engine to locate and access the content for cataloging and permitting the customer to access the content).

As can be seen, the access settings 212 allow a user to partition his or her user content 204. Assuming Bob and Susan are not part of the user's family, it can be seen that the user may prevent Bob and Susan from accessing the family vacations subset 208G, while allowing them access to the main page subset 208E and the car page subset 208F. In this manner, the user is free to share his or her family vacation content online through the journaling system without worrying that Bob and Susan, or others he or she does not wish to show family vacation content to, will see such content.

FIG. 4 illustrates that subsets 208 of user content may be content from other users. For example, in FIG. 4, the user content 204A of a first user may include user content or various subsets thereof of other users. In FIG. 4 this is illustrated as parent company user content 204A which is made up of user content 204B, 204C from subsidiaries A and B of the parent company.

As can be seen, the subsidiary user content 204B, 204C may comprise subsets 208 such as the sales and outlook for the subsidiaries. As disclosed above, access to each subset 208 of information may be controlled by one or more associated access controls.

FIG. 5 is a flow diagram illustrating an exemplary setup process for the access settings for particular subsets of user information. At a step 504, the user may login, such as by providing identification such as a username and password or the like. If the identification is valid (i.e., the user has entered in a valid password), he or she may be permitted to perform one or more actions relating to user information. For example, the user may be permitted to update, delete, or add user information. In addition, the user may separate or divide user information into different subsets.

As shown in FIG. 5, the user may input data at step 508. For example, user information of various types may be inputted at step 508. Examples of user information have been disclosed above. The user information may be stored on a storage device.

At a step 512, the user may setup access settings for his or her user information. For example, the user may define which other users are allowed access to certain subsets or all of the user information. As disclosed above, the user may specify individual users and/or specify criteria which must be met by users in order to obtain access to user information. The access settings may be stored on a storage device in one or more embodiments. This storage device may be part of a server configured to provide the user information or may be part of a server configured to serve only access settings. In this manner, the access settings may be stored separately and accessed separately from the user information. This improves availability and helps spread network or resource loads across multiple servers.

At a step 516, the user may assign one or more of the access settings to one or more subsets of user information. For example, the user may assign a first access setting to a first subset of user information and assign a second access setting to a second subset of user information, such as described above. It is noted the user information as a whole may be assigned to a single access setting if desired by the user.

At a decision step 520, the user may choose or be presented with the option to logout. If the user does not log out, he or she may enter additional user information at step 508. Alternatively, if the user does log out, he or she may log in again later at step 504 when desired.

FIG. 6 is a flow diagram illustrating retrieval or access of user information by a user. At a step 604, a request for a subset of user information may be received. For instance, a user may request personal, work, or other information subsets from another user's user information. At a step 608, the access setting associated with the requested subset may be retrieved from the storage device or medium it was stored on.

At a decision step 612, it may be determined whether or not the requesting user should be provided access to the subset of user information that has been requested. For example, one or more user identifiers or other user characteristics, such as from the user's account, may be compared to the access setting or settings. If there is a match then, the requested subset of user information may be shown or provided to the user at step 616. If there is not a match, the requested subset of user information will not be provided to the user and may be hidden from the user such as illustrated at a step 620.

The comparison at decision step 612 may take place in various ways. For example, if the user's identifier (e.g., username, email, nickname, real name) matches that of users identified in the access settings, then the user may be provided the requested subset of user information. Alternatively or in addition, a user characteristic, such as the user's age, what groups the user belongs to, the user's gender, employer, career/job, and other characteristics may be matched to those set in the access settings. If one or more characteristics match, then the user may be provided the requested subset of user information. It is noted that an access setting may require that multiple characteristics match before a requested subset will be provided to a requesting user.

As can be seen, the journaling system herein allows a user to segregate their information or content in a manner by which only specified third parties can access particular subsets of the user's information. This allows the user to make content available for viewing or other access by third parties without the worry that access to the information or content is uncontrolled.

The invention has particular utility to social media type websites wherein a user posts or provides user content which is made accessible to other users of the website or service. As indicated herein, however, the invention permits the user to define or control which users of that website or service are permitted to access or view different of the user's content.

The present invention has great advantages over existing social media, blog or other types of websites or systems where user information is freely accessible to the public or all members or users of the service. As indicated above, such a configuration may be deemed wholly undesirable by a user. For example, even if a user has a great deal of information which they are willing to share publicly, they may be unwilling or wary to post any information if they have even some information which is relatively private. Thus, for example, many people who have an interest in posting information on Facebook so that they may socialize with their friends, do not have Facebook accounts at all because Facebook allows all Facebook users to access all other Facebook users' information.

In addition, the present invention has advantages over sites and systems by which user information is rendered entirely private. For example, services like Photobucket permit a user to upload photographs to a remote account. The user may then access their photos from any computer by accessing their account using their user name and password. This allows, for example, a user to upload their photos from a home computer and then later access them from their remote office computer. In this arrangement, the user's content is made entirely private and is only accessible to the user by the user's use of their user name and password. Of course, the user could provide their user name and password to friends or family to allow them to access the same photos. However, this compromises the user's own user name and password. In addition, this arrangement still does not permit the user to segregate content and permit only certain third parties to access certain content and not other content.

The invention includes other features and benefits. In one embodiment, a single user uploads or posts content and controls access thereto by segregating data and providing access controls for each set of data. In another embodiment, a group of users might be permitted to upload or post content, wherein access control extends to the ability to post or upload content. For example, a user (such as a politician), might create one or more pages relating to different political topics. The politician might permit third parties to contribute or post information to those pages. However, the politician might define different access control for each of the pages. For example, the politician might have an "internal" page which can only be accessed by the politician and his staff The staff (but not the general public) might then post information on that internal page, such as for viewing only by the politician and staff or for viewing by others (in this regard, access control as to users who may post information may be different from the access control as to parties who may view or access posted information). The politician might have a more general "public" page. The politician might allow registered party members to post information to the public page (and then might only allow those same parties to view the posted information or might allow a different range of parties, such as the general public, to view that information). One great advantage of this arrangement is that a politician or other user may utilize a single site or service for "private" and "public" purposes, thus avoiding the need for them to have entirely separate services or accounts for different users.

As another example of this aspect of the invention, referring to FIG. 3, access control might allow Bob and Susan to post information (such as text, pictures, etc.) to page 2 and associated content 208F (but not to page 3 and associated content 208G). Likewise, the access control might permit family members to post information to page 3 and associated content 208G, but not page 2 and associated content 208F.

As indicated above, in one embodiment segregated data (such as associated with different pages, including pages belonging to different users) might be merged or combined.

For example, as illustrated in FIG. 4, a parent company might own two subsidiaries. Each subsidiary might have its own journal or website of content, which content may be divided or segregated. For example, the subsidiaries may each provide pages or segments of information relating to year to date sales and forecasted future sales. In accordance with one embodiment of the invention, the parent company may be provided access to all of that content and may merge or transfer the content regarding each subsidiary into a combined page or site. For example, the parent company might transfer data from each subsidiary's site at the end of a fiscal year to thereby yield or create a single site having combined information, such as an overview of the entire company's past sales and forecasted business.

While a preferred embodiment of a journaling system and various methods have been described, it will be appreciated that the journaling system might not include all of the features of the invention and/or might include other features. In addition, various features of the invention might be used in other environments. For example, the Facebook® social media site allows users to post information for viewing by other Facebook® users. In accordance with the invention, a user might allow a non-Facebook® user to access their information by providing that person with certain access information, such as a token.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A journaling system for storing two or more subsets of user's information and controlling access thereto to third parties designed by the user, comprising:
   one or more communications devices configured to receive the user information and one or more user-designated access settings, wherein said user information is grouped into subsets of information, each subset comprising one or more pages of said user's information, and wherein a user-designated access setting is associated with each subset of user information, each user-designated access setting designating one or more third parties who may access user information, wherein user-designated access settings associated with different subsets of user information may designate different third parties who may access said different subsets of said user information;
   one or more processors configured to control access to the subsets of user information to those third parties defined by said user-designated access settings by comparing information identifying a third party requesting access to one or more subsets of user information to the one or more user-designated access settings, wherein access to one or more of the one or more subsets is granted only if said third party is designated by the one or more user-designated access settings; and
   one or more storage devices configured to retrievably store the subsets of the user information for delivery to a third party to whom access is granted.

2. The journaling system of claim 1, wherein the one or more subsets of the user information comprise information selected from the group consisting of personal information, career information, and hobby information.

3. The journaling system of claim 1, wherein the one or more subsets of the user information comprise one or more subsets of user information from one or more subset of user information provided by a third party.

4. The journaling system of claim 1, wherein the one or more communications devices are configured to transmit to the third party the one or more subsets of user information retrieved by the one or more storage devices.

5. The journaling system of claim 1 further comprising a main user-designated access setting associated with all of the user's information, wherein if information identifying a third party matches said main user-designated access setting, said third party is granted access to all of the user's user information.

6. The journaling system of claim 1, wherein the one or more communications devices are configured to receive the one or more access settings from a user terminal.

7. The journaling system of claim 1, wherein the one or more communications devices are configured to receive the user information from a user terminal.

8. A journaling system for storing two or more subsets of user's user information and controlling access thereto to third parties designated by the user, comprising:
   one or more communications devices configured to receive the user information, and the user information comprising information provided by the user and information provided by one or more third parties, the information grouped into subsets comprising one or more pages, and one or more user-designated access settings, wherein a user-designated access settings is associated with each subset of user information, each user-designated access setting designating one or more third parties who may access user information, wherein user-designated access settings associated with different subsets of user information may designate different third parties who may access said different subsets of said user information;
   one or more processors configured to control access to the subsets of user information to those third parties defined by said user-designated access settings by comparing information identifying a third party requesting access to one or more subsets of user information to the one or more user-designated access settings, wherein access to one or more of the one or more subsets is granted only if said third party is designated by the one or more user-designated access settings; and
   one or more storage devices configured to retrievably store the two or more subsets of the user information for delivery to a third party to whom access is granted.

9. The journaling system of claim 8, wherein the subsets of user information are grouped into pages comprising chapters of a user's journal.

10. The journaling system of claim 8, wherein the user is a corporation and the one or more other third parties supplying user information are subsidiaries of the corporation.

11. The journaling system of claim 8, wherein the one or more communications devices are configured to receive the one or more user-designated access settings from a user terminal.

12. The journaling system of claim 8, wherein the user-designated access settings control those third parties who may supply user information.

13. The journaling system of claim 11, wherein the one or more communications devices are configured to transmit to the third party to whom access is granted the one or more subsets of user information retrieved by the one or more storage devices.

14. The journaling system of claim 8 further comprising a main user-designated access setting associated with all of the user's user information, wherein if information identifying a third party matches said main user-designated access setting, said third party is granted access to all of the user's user information.

15. A method of controlling access by third parties to two or more subsets of user information with a journaling system comprising:

receiving from a user the one or more subsets of the user information at one or more servers of the journaling system, wherein said subsets of information comprise information grouped into one or more pages;

receiving from the user one or more user-designated access settings which designate third parties who may access the subsets of user information, wherein different user-designated access settings may be associated with different subsets of user information and different user access settings may designate different third parties who may access the subsets of user information;

associating the one or more user-designated access settings with the subsets of the user information;

receiving a request from a third party to access at least one of said subsets of user information;

determining if said third party seeking access to the one or more subsets of user information comprises a third party designated by said user-designated access settings associated with said one or more subsets; and if so, retrieving the one or more subsets of the user information which the third party is granted access from one or more storage devices; and transmitting the one or more subsets of the user information to the third party;

and, if not, preventing access to the one or more subsets of the user information by the third party seeking access thereto.

16. The method of claim 15, wherein the one or more servers of the journaling system receive an indicator from the user defining which of the one or more user-designated access settings are associated with which of the one or more subsets of the user information.

17. The method of claim 15, wherein the one or more user-designated access settings designate one or more third parties by a name of the third party.

18. The method of claim 17, wherein the name comprises a user name of the third party.

19. The method of claim 15, wherein said subsets of information comprise chapters of a journal of the user and further comprising the step of grouping said user information into pages associated with said chapters.

20. The method of claim 15 further comprising receiving one or more user identifiers from the user as part of the one or more access settings, the one or more user identifiers identifying the particular one or more other users.

\* \* \* \* \*